US012181832B2

(12) United States Patent
Takahashi et al.

(10) Patent No.: US 12,181,832 B2
(45) **Date of Patent: *Dec. 31, 2024**

(54) ELECTROPHOTOGRAPHIC PHOTOSENSITIVE MEMBER, PROCESS CARTRIDGE, AND ELECTROPHOTOGRAPHIC APPARATUS

(71) Applicant: CANON KABUSHIKI KAISHA, Tokyo (JP)

(72) Inventors: Koji Takahashi, Chiba (JP); Masayuki Shinozuka, Ibaraki (JP); Motoya Yamada, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 510 days.

This patent is subject to a terminal disclaimer.

(21) Appl. No.: 17/650,991

(22) Filed: Feb. 14, 2022

(65) Prior Publication Data

US 2022/0276577 A1 Sep. 1, 2022

(30) Foreign Application Priority Data

Feb. 26, 2021 (JP) ................................. 2021-031218
Dec. 15, 2021 (JP) ................................. 2021-203748

(51) Int. Cl.
*G03G 5/10* (2006.01)
*G03G 21/18* (2006.01)

(52) U.S. Cl.
CPC ......... *G03G 5/102* (2013.01); *G03G 21/1814* (2013.01)

(58) Field of Classification Search
CPC .... G03G 5/102; G03G 21/1814; G03G 15/75; G03G 5/0436; G03G 5/0507
See application file for complete search history.

(56) References Cited

U.S. PATENT DOCUMENTS 4,686,165 A * 8/1987 Suda ...................... G03G 5/102 430/84
4,939,057 A * 7/1990 Honda ................... G03G 5/102 430/69

(Continued)

FOREIGN PATENT DOCUMENTS

JP 59-228255 A 12/1984
JP 2009-150958 A 7/2009

(Continued)

OTHER PUBLICATIONS

U.S. Appl. No. 17/649,570, filed Feb. 1, 2022, Masayuki Shinozuka.

(Continued)

*Primary Examiner* — Stewart A Fraser
(74) *Attorney, Agent, or Firm* — VENABLE LLP

(57) ABSTRACT

An electrophotographic photosensitive member having: a support with a cylindrical shape; and a photosensitive layer, in which the support has a surface formed of Al and/or an Al alloy, and the surface of the support includes Al crystal grains having (α) plane having {001} orientation of −15° or more and less than +15°, (β) plane having {101} orientation of −15° or more and less than +15°, and (γ) plane having {111} orientation of −15° or more and less than +15°, a ratio of an area occupied by Al crystal grains having (γ) to the total area of the surface of the support is 10% or less, and a ratio of an area occupied by any one of Al crystal grains having (α) and Al crystal grains having (β) is 60% or more.

11 Claims, 3 Drawing Sheets

(56) References Cited

U.S. PATENT DOCUMENTS

| | | | |
|---|---|---|---|
| 5,908,724 | A | 6/1999 | Matsui |
| 8,457,528 | B2 | 6/2013 | Ochi et al. |
| 8,865,380 | B2 | 10/2014 | Noguchi et al. |
| 9,114,565 | B2 | 8/2015 | Kawai et al. |
| 9,389,521 | B2 | 7/2016 | Takahashi et al. |
| 9,766,561 | B2 | 9/2017 | Takahashi et al. |
| 9,772,596 | B2 | 9/2017 | Mitsui |
| 10,042,273 | B2 | 8/2018 | Takahashi et al. |
| 10,429,754 | B2 | 10/2019 | Takahashi et al. |
| 10,558,132 | B2 | 2/2020 | Ishiduka et al. |
| 10,642,174 | B2 | 5/2020 | Kobayashi |
| 10,674,174 | B2 | 6/2020 | Omori |
| 11,112,707 | B2 | 9/2021 | Takahashi et al. |
| 2006/0194132 | A1 | 8/2006 | Hosoi et al. |
| 2014/0093281 | A1 | 4/2014 | Takahashi et al. |
| 2017/0227130 | A1 | 8/2017 | Kohlen |
| 2021/0302849 | A1 | 9/2021 | Takahashi |
| 2023/0350315 | A1* | 11/2023 | Kojima .............. G03G 21/1814 |
| 2023/0350316 | A1* | 11/2023 | Yamada ................. G03G 5/102 |
| 2023/0350317 | A1* | 11/2023 | Shinozuka ......... G03G 21/1814 |
| 2024/0103390 | A1* | 3/2024 | Takahashi .......... G03G 15/0808 |

FOREIGN PATENT DOCUMENTS

| | | | |
|---|---|---|---|
| JP | 2017-111409 | A | 6/2017 |
| WO | 2019/077705 | A1 | 4/2019 |

OTHER PUBLICATIONS

U.S. Appl. No. 17/651,637, filed Feb. 18, 2022, Motoya Yamada.
Koberunikusu, vol. 14, No. 28 (Oct. 2005) (discussed at specification paragraph [0014]).

* cited by examiner

ELECTROPHOTOGRAPHIC PHOTOSENSITIVE MEMBER, PROCESS CARTRIDGE, AND ELECTROPHOTOGRAPHIC APPARATUS

BACKGROUND OF THE INVENTION

Field of the Invention

The present invention relates to an electrophotographic photosensitive member, a process cartridge including the electrophotographic photosensitive member, and an electrophotographic apparatus including the electrophotographic photosensitive member.

Description of the Related Art

In recent years, diversification of users of electrophotographic apparatuses has progressed, and there is an increasing need for an output image to have higher image quality than before.

International Publication No. WO2019/077705 describes, as a technique related to image quality improvement, a technique in which a stress value inside an electroconductive support is in a range of −30 to 5 MPa.

Japanese Patent Application Laid-Open No. 2009-150958 describes a technique of heating an aluminum alloy element tube at 190° C. to 550° C. before cutting as a technique of improving image quality from the viewpoint of accuracy.

In addition, Japanese Patent Application Laid-Open No. 2017-111409 describes a technique in which the average area of crystal grains of an Al alloy having a specific composition is 3 to 100 $\mu m^2$.

According to investigation by the present inventors, the electrophotographic photosensitive members described in International Publication No. WO2019/077705, Japanese Patent Application Laid-Open No. 2009-150958, and Japanese Patent Application Laid-Open No. 2017-111409 have been problematic in that the outlines of dots and lines forming an output image are easily blurred.

Therefore, an object of the present invention is to provide an electrophotographic photosensitive member capable of suppressing blurring of dots and lines forming an output image.

SUMMARY OF THE INVENTION

The above object is achieved by the following present invention. That is, an electrophotographic photosensitive member according to an aspect of the present invention is an electrophotographic photosensitive member having a support with a cylindrical shape and a photosensitive layer, wherein

- the support has a surface formed of Al and/or an Al alloy, and
- the surface of the support comprises an Al crystal grain having
  - (α) plane having {001} orientation of −15° or more and less than +15°,
  - (β) plane having {101} orientation of −15° or more and less than +15°, and
  - (γ) plane having {111} orientation of −15° or more and less than +15°,
- a ratio of an area occupied by an Al crystal grain having (γ) to the total area of the surface of the support is 10% or less, and a ratio of an area occupied by any one of an Al crystal grain having (α) and an Al crystal grain having (β) is 60% or more.

In addition, a process cartridge according to another aspect of the present invention integrally supports the electrophotographic photosensitive member and at least one unit selected from the group consisting of a charging unit, a developing unit, and a cleaning unit, and is detachably attachable to a main body of an electrophotographic apparatus.

In addition, an electrophotographic apparatus according to still another aspect of the present invention includes the electrophotographic photosensitive member, and a charging unit, an exposing unit, a developing unit, and a transfer unit.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Hereinafter, the present invention will be described in detail with reference to preferable embodiments.

As a result of investigation by the present inventors, it has been found that the techniques described in International Publication No. WO2019/077705, Japanese Patent Application Laid-Open No. 2009-150958, and Japanese Patent Application Laid-Open No. 2017-111409 have a possibility that a slight potential variation due to minute resistance unevenness of the electroconductive support is generated in an exposed portion of the electrophotographic photosensitive member. As a result, it has been considered that blurring of the dots forming the output image easily occurred.

In order to solve the above technical problem occurring in the prior art, the present inventors have investigated the crystal orientation of the surface of an aluminum support.

As a result of the above investigation, it has been found that the above technical problem can be solved by using the following electrophotographic photosensitive member according to the present invention.

That is, an electrophotographic photosensitive member according to the present invention is an electrophotographic photosensitive member having a support with a cylindrical shape and a photosensitive layer, wherein

- the support has a surface formed of Al and/or an Al alloy,
- the surface of the support comprises an Al crystal grain having
  - (α) plane having {001} orientation of −15° or more and less than +15°,
  - (β) plane having {101} orientation of −15° or more and less than +15°, and
  - (γ) plane having {111} orientation of −15° or more and less than +15°,
- a ratio of an area occupied by an Al crystal grain having (γ) to the total area of the surface of the support is 10% or less, and a ratio of an area occupied by any one of an Al crystal grain having (α) and an Al crystal grain having (β) is 60% or more.

In the present invention, for example, a plane having a {111} orientation of −15° or more and less than +15° refers to a crystal plane having a variation of −15° or more and less than +15° from a {111} plane in an aluminum crystal.

The present inventors consider, as follows, a mechanism that can solve the above technical problem in the prior art by the configuration of the present invention.

Figure 1A:
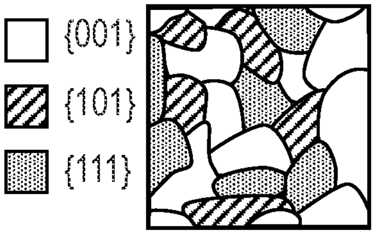
FIGS. 1A, FIG. 1B, and FIG. 1C are views illustrating a distribution of Al crystal grains.

There are roughly three crystal orientations of aluminum, namely, the {101} orientation, the {001} orientation, and the {111} orientation. As described in "Koberunikusu" ([No. 28] Vol. 14 2005 October), for example, as illustrated in FIG. 1A, typically, crystal grains having each crystal orientation are randomly distributed.

The present inventors presume that easiness of electron flow of crystal grains varies depending on the crystal orientation, and crystal grains having a plane of the {101} orientation of −15° or more and less than +15° and crystal grains having a plane of the {001} orientation of −15° or more and less than +15° easily flow electrons as compared with crystal grains having a plane of the {111} orientation of −15° or more and less than +15°.

In the aluminum support in the prior art, crystal grains of three kinds of crystal orientations are randomly present, and therefore it is considered that potential unevenness is generated in the dot formation region while being minute, thereby causing blurring.

Figure 1B:
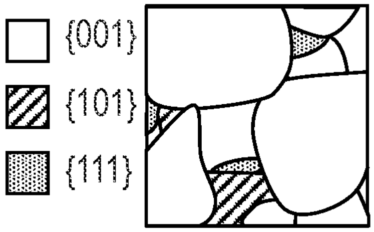
Figure 1C:
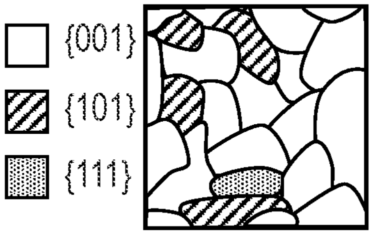

As illustrated in, for example, FIGS. 1B and FIG. 1C, the surface of the aluminum support is formed in a state in which there are rich crystal grains having a plane of the {101} orientation of −15° or more and less than +15° or crystal grains having a plane of the {001} orientation of −15° or more and less than +15°, which are estimated to allow electrons to easily flow. As a result, it is considered that the current flowing through the surface of the aluminum support becomes uniform, and the minute potential unevenness is improved, thereby allowing reducing the blurring of the dot.

[Electrophotographic Photosensitive Member]

The electrophotographic photosensitive member according to the present invention includes a support with a cylindrical shape and a photosensitive layer.

Examples of the method for producing the electrophotographic photosensitive member according to the present invention include a method of preparing a coating liquid for each layer described later, applying in order of desired layers, and drying. In this case, examples of the method of applying the coating liquid include dip coating, spray coating, inkjet coating, roll coating, die coating, blade coating, curtain coating, wire bar coating, and ring coating. Of these, dip coating is preferable from the viewpoint of efficiency and productivity.

Hereinafter, the support and each layer will be described.

<Support>

The electrophotographic photosensitive member according to the present invention has a support with a cylindrical shape, and the surface of the support is formed of at least one selected from Al and an Al alloy. In addition, the surface of the support may be subjected to hot water treatment, blast treatment, or cutting treatment.

(1) Crystal Orientation

The notation of the crystal orientation of Al in the surface direction of the support surface in the present invention, for example, a plane of the {001} orientation, indicates a crystal plane of Al with the Miller index. That is, a plane of the {001} orientation is a comprehensive expression of the Miller index indicating any one of (001), (010), (100), (00-1), (0-10), and (−100) of crystal lattice planes.

In the present invention, a surface of the support includes Al crystal grains having:

(α) plane having {001} orientation of −15° or more and less than +15°;

(β) plane having {101} orientation of −15° or more and less than +15°; and (γ) plane having {111} orientation of −15° or more and less than +15°, wherein a ratio of an area occupied by Al crystal grains having (γ) to the total area of the surface of the support is 10% or less, and a ratio of an area occupied by any one of Al crystal grains having (α) and Al crystal grains having (β) is 60% or more.

From the viewpoint of increasing the number of planes through which electrons can easily flow, the ratio of the area occupied by one of the Al crystal grains having (α) and the Al crystal grains having (β) is preferably 67% or more. In addition, the ratio of the area occupied by one of the Al crystal grains having (α) and the Al crystal grains having (β) is preferably 75% or more. Particularly, the ratio of the area occupied by the Al crystal grains having (β) is 75% or more, whereby the effect of the present invention can be obtained better.

In addition, from the viewpoint of reducing the number of the plane though which electrons hardly flow, the ratio of the area occupied by the Al crystal grains having (γ) is preferably 5% or less.

(Method of Measuring Crystal Orientation of Al Crystal Grains on Surface of Support)

In the present invention, the crystal orientation of the Al crystal grains on the surface of the support can be measured, for example, as follows.

The surface of the support is treated by buffing or an aqueous solution of sodium hydroxide, and the crystal orientation of the Al crystal grains is measured at a point within 20 μm from the surface of the support before the treatment. The crystal orientation is preferably measured by the SEM-EBSP method.

The measurement by the SEM-EBSP method uses an FE-SEM (field emission-scanning electron microscope) equipped with an EBSP (electron backscatter diffraction pattern) detector. Herein, the SEM-EBSP method is a method capable of determining a crystal orientation of an electron beam irradiation position and a crystal system by analyzing a Kikuchi pattern obtained from reflected electrons generated when a surface of a test piece is irradiated with an electron beam. In addition, the Kikuchi pattern refers to a pattern that appears behind an electron diffraction image in a form of a parallel line with a pair of black and white, a band shape, or an array shape when an electron beam hitting a crystal is scattered and diffracted.

For example, a field emission scanning electron microscope (trade name: JSM-6500F, manufactured by JEOL Ltd.) can be used as the FE-SEM equipped with the EBSP detector.

(2) Area of Al Crystal Grains on Surface of Support

In the present invention, a surface of the support includes Al crystal grains having:

(α) plane having {001} orientation of −15° or more and less than +15°;

(β) plane having {101} orientation of −15° or more and less than +15°; and (γ) plane having {111} orientation of −15° or more and less than +15°, wherein a ratio of an area occupied by Al crystal grains having (γ) to the total area of the surface of the support is 10% or less, and a ratio of an area occupied by any one of Al crystal grains having (α) and Al crystal grains having (β) is 60% or more.

The ratio of the area occupied by the Al crystal grains having each of the above crystal orientations can be determined as follows.

Figure 2:
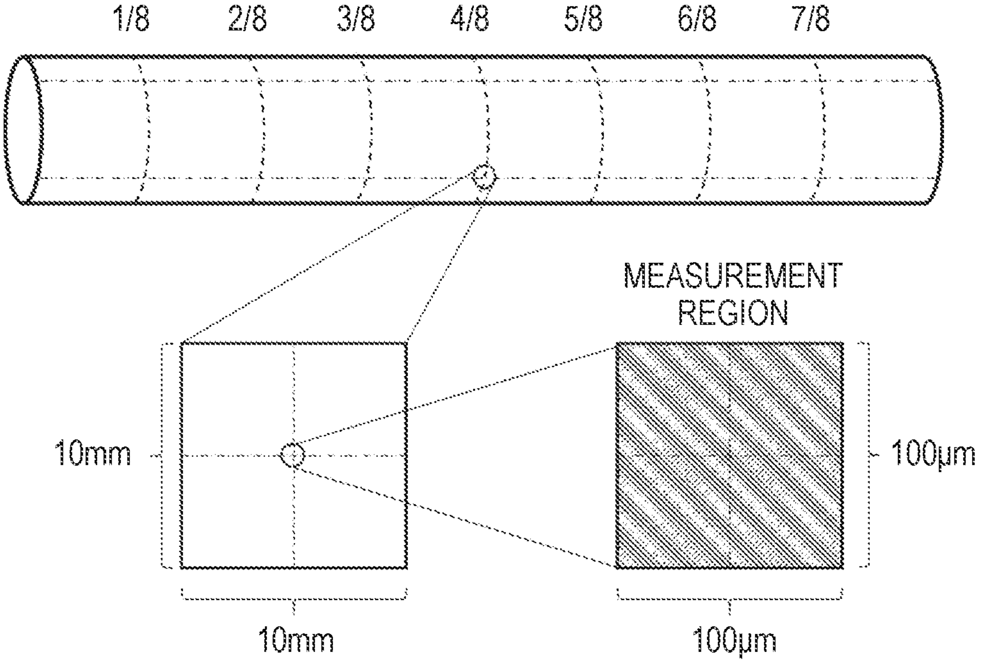
FIG. 2 is a view illustrating measurement positions of Al crystal grains.
Figure 3:
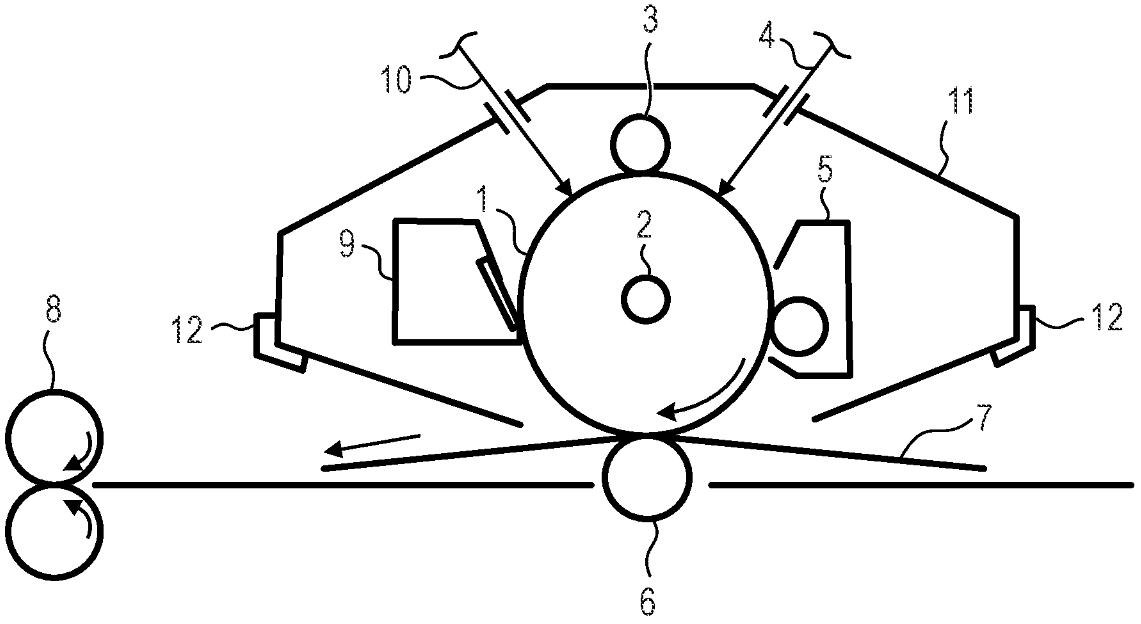
FIG. 3 is a view illustrating an example of a schematic configuration of an electrophotographic apparatus having a process cartridge including an electrophotographic photosensitive member.

As illustrated in FIG. 2, positions corresponding to ⅛, 2/8, 3/8, 4/8, ⅝, 6/8, and ⅞ of the total length in the axial direction from any one end of the support are determined. Furthermore, each position is divided into four by 90° in the circumferential direction. At each of 28 points where the axial division line and the circumferential division line intersect, a 100 μm square region is set so that the intersection of the axial division line and the circumferential division line is at the center, and the crystal orientation is measured by the SEM-EBSP method. Then, for the Al crystal grains having the (α), (β), and (γ) crystal orientations, the area occupied by each orientation is calculated, and the obtained value is divided by 10000 $\mu m^2$ to determine the ratio of the area occupied by the Al crystal grains having each crystal orientation in each region. Finally, the average value of the respective values obtained from the 28 regions is determined as the ratio of the area occupied by (α), (β), and (γ) of the support.

The area occupied by the Al crystal grains having each crystal orientation may be calculated by using attached software, or may be calculated, for example, by performing hue mapping of the region of the Al crystal grains having each crystal orientation with the hue h in the HSV color space by setting the range of (α) to $0 \leq h < 60$ and $300 \leq h < 360$, the range of (β) to $60 \leq h < 180$, and the range of (γ) to $180 \leq h < 300$.

In the present invention, the average area of Al crystal grains on the surface of the support is preferably 5 $\mu m^2$ or more. The average area of the Al crystal grains on the surface of the support can be determined as follows.

The same region as described above is observed, and the area of each Al crystal grain region specified by this observation is obtained. Then, all the Al crystal grains that are within the observed 100 μm-square region and do not cross the region in the frame of the 100 μm-square region are taken as a population, and an average value is calculated for the area of the region occupied by the Al crystal grains.

(3) Al Alloy for Use as Support

From the viewpoint of controlling the crystal orientation, the support is preferably a 3000 series Al alloy, for example, a JIS A3003 alloy or a 6000 series Al alloy, for example, JIS A6063 alloy. Specifically, JIS A3003 alloy is an Al alloy including 0.6% by mass or less of Si, 0.7% by mass or less of Fe, 0.05 to 0.2% by mass of Cu, 1.0 to 1.5% by mass of Mn, and 0.1% by mass or less of Zn. In addition, specifically, JIS A6063 alloy is an Al alloy including 0.2 to 0.6% by mass of Si, 0.35% by mass or less of Fe, 0.1% by mass or less of Cu, 0.1% by mass or less of Mn, 0.45 to 0.9% by mass of Mg, 0.1% by mass or less of Cr, 0.1% by mass or less of Zn, and 0.1% by mass or less of Ti.

(4) Method of Producing Support

The method of producing the support is not particularly limited as long as the support satisfying the requirements of the present invention can be produced.

Examples of the method of producing the support include a method including the following four steps.

Preparing specific Al alloy, and performing hot extruding to provide a molded body Cold drawing the molded body Annealing after the cold drawing Cutting the surface after annealing When the crystal orientation is controlled by annealing, the crystal orientation can be controlled by adjusting the temperature rise time, the annealing temperature, the holding time, and the cooling time.

Particularly, setting the annealing temperature to 405 to 450° C. generates recrystallization such that planes of crystal grains having the {101} orientation and the {001} orientation on the surface. Therefore, the ratio of the area occupied by the crystal grains having the {101} orientation and the {001} orientation on the surface of the support increases.

Furthermore, a change occurs depending on the temperature rise rate, the holding time, and the cooling rate, and therefore the temperature rise rate is preferably controlled to 40° C./min or less, and the temperature drop rate is preferably controlled to 5° C./min or less until the temperature of the support reaches 150° C.

The holding time is preferably 2 hours or more in order to cause sufficient recrystallization.

In addition, the thermal history is important in controlling the crystal orientation, and therefore it is preferable to anneal the product that has been subjected to hot extruding and cold drawing described above.

<Electroconductive Layer>

In the present invention, an electroconductive layer may be provided on the support. Providing the electroconductive layer can conceal scratches and irregularities on the surface of the support, and can control reflection of light on the surface of the support.

The electroconductive layer preferably includes electroconductive particles and a resin.

Examples of the material of the electroconductive particles include metal oxides, metals, and carbon black.

Examples of the metal oxide include zinc oxide, aluminum oxide, indium oxide, silicon oxide, zirconium oxide, tin oxide, titanium oxide, magnesium oxide, antimony oxide, and bismuth oxide. Examples of the metal include aluminum, nickel, iron, nichrome, copper, zinc, and silver.

Of these, it is preferable to use a metal oxide as the electroconductive particles, and in particular, it is more preferable to use titanium oxide, tin oxide, or zinc oxide.

When a metal oxide is used as the electroconductive particles, the surface of the metal oxide may be treated with, for example, a silane coupling agent, or the metal oxide may be doped with an element such as phosphorus or aluminum or an oxide thereof.

In addition, the electroconductive particle may have a stacked configuration including a core particle and a coating layer coating the particle. Examples of the core particles include titanium oxide, barium sulfate, and zinc oxide. Examples of the coating layer include metal oxides such as tin oxide.

In addition, when a metal oxide is used as the electroconductive particles, the volume average particle size thereof is preferably 1 to 500 nm, and more preferably 3 to 400 nm.

Examples of the resin include a polyester resin, a polycarbonate resin, a polyvinyl acetal resin, an acrylic resin, a silicone resin, an epoxy resin, a melamine resin, a polyurethane resin, a phenol resin, and an alkyd resin.

In addition, the electroconductive layer may further contain, for example, silicone oil, resin particles, and a masking agent such as titanium oxide.

The film thickness of the electroconductive layer is preferably 1 to 50 μm, and particularly preferably 3 to 40 μm.

The electroconductive layer can be formed by preparing an electroconductive-layer coating liquid containing each of the above materials and a solvent, forming a film, and drying the film. Examples of the solvent used in the coating liquid include an alcohol-based solvent, a sulfoxide-based solvent, a ketone-based solvent, an ether-based solvent, an ester-based solvent, and an aromatic hydrocarbon-based solvent. Examples of the dispersion method for dispersing the electroconductive particles in the electroconductive-layer coating liquid include methods using a paint shaker, a sand mill, a ball mill, and a liquid collision type high-speed disperser.

<Undercoat Layer>

In the present invention, an undercoat layer may be provided on the support or the electroconductive layer. Providing the undercoat layer enhances an adhesion function between layers, and can impart a charge injection blocking function.

The undercoat layer preferably includes a resin. In addition, an undercoat layer may be formed as a cured film by polymerizing a composition containing a monomer having a polymerizable functional group.

Examples of the resin include a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamic acid resin, a polyimide resin, a polyamideimide resin, and a cellulose resin.

Examples of the polymerizable functional group of the monomer having a polymerizable functional group include an isocyanate group, a blocked isocyanate group, a methylol group, an alkylated methylol group, an epoxy group, a metal alkoxide group, a hydroxyl group, an amino group, a carboxyl group, a thiol group, a carboxylic anhydride group, and a carbon-carbon double bond group.

In addition, the undercoat layer may further contain, for example, an electron transporting material, a metal oxide, a metal, and an electroconductive polymer for the purpose of improving electrical characteristics. Of these, an electron transporting substance and a metal oxide are preferably used.

Examples of the electron transporting material include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound. The undercoat layer may be formed as a cured film by using an electron transporting material having a polymerizable functional group as the electron transporting material and copolymerizing the electron transporting material with the monomer having a polymerizable functional group described above.

Examples of the metal oxide include indium tin oxide, tin oxide, indium oxide, titanium oxide, zinc oxide, aluminum oxide, and silicon dioxide. Examples of the metal include gold, silver, and aluminum.

In addition, the undercoat layer may further contain an additive.

The thickness of the undercoat layer is preferably 0.1 to 50 μm, more preferably 0.2 to 40 μm, and particularly preferably 0.3 to 30 μm.

The undercoat layer can be formed by preparing an undercoat-layer coating liquid containing each of the above materials and a solvent, forming a film, and drying and/or curing the film. Examples of the solvent used in the coating liquid include an alcohol-based solvent, a ketone-based solvent, an ether-based solvent, an ester-based solvent, and an aromatic hydrocarbon-based solvent.

<Photosensitive Layer>

The photosensitive layer of the electrophotographic photosensitive member is mainly classified into (1) a laminate type photosensitive layer and (2) a monolayer type photosensitive layer. (1) The laminate type photosensitive layer includes a charge generating layer containing a charge generating material and a charge transporting layer containing a charge transporting material. (2) The monolayer type photosensitive layer includes a photosensitive layer containing both a charge generating material and a charge transporting material.

(1) Laminate Type Photosensitive Layer

The laminate type photosensitive layer includes a charge generating layer and a charge transporting layer.

(1-1) Charge Generating Layer

The charge generating layer preferably contains a charge generating material and a resin.

Examples of the charge generating material include azo pigments, perylene pigments, polycyclic quinone pigments, indigo pigments, and phthalocyanine pigments. Of these, azo pigments and phthalocyanine pigments are preferable. Of the phthalocyanine pigments, oxytitanium phthalocyanine pigments, chlorogallium phthalocyanine pigments, and hydroxygallium phthalocyanine pigments are preferable.

The content of the charge generating material in the charge generating layer is preferably 40 to 85% by mass, and more preferably 60 to 80% by mass, with respect to the total mass of the charge generating layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin, and a polyvinyl chloride resin. Of these, a polyvinyl butyral resin is more preferable.

In addition, the charge generating layer may further contain additives such as an antioxidant and an ultraviolet absorber. Specific examples thereof include a hindered phenol compound, a hindered amine compound, a sulfur compound, a phosphorus compound, and a benzophenone compound.

The film thickness of the charge generating layer is preferably 0.1 to 1 μm, and more preferably 0.15 to 0.4 μm.

The charge generating layer can be formed by preparing a charge-generating-layer coating liquid containing each of the above materials and a solvent, forming a film, and drying the film. Examples of the solvent used in the coating liquid include an alcohol-based solvent, a sulfoxide-based solvent, a ketone-based solvent, an ether-based solvent, an ester-based solvent, and an aromatic hydrocarbon-based solvent.

(1-2) Charge Transporting Layer

The charge transporting layer preferably contains a charge transporting material and a resin.

Examples of the charge transporting material include a polycyclic aromatic compound, a heterocyclic compound, a hydrazone compound, a styryl compound, an enamine compound, a benzidine compound, a triarylamine compound, and a resin having a group derived from these materials. Of these, a triarylamine compound and a benzidine compound are preferable.

The content of the charge transporting material in the charge transporting layer is preferably 25 to 70% by mass, and more preferably 30 to 55% by mass, with respect to the total mass of the charge transporting layer.

Examples of the resin include a polyester resin, a polycarbonate resin, an acrylic resin, and a polystyrene resin. Of these, a polycarbonate resin and a polyester resin are preferable. The polyester resin is particularly preferably a polyarylate resin.

The content ratio (mass ratio) between the charge transporting material and the resin is preferably 4:10 to 20:10, and more preferably 5:10 to 12:10.

In addition, the charge transporting layer may contain additives such as an antioxidant, an ultraviolet absorber, a plasticizer, a leveling agent, a slipperiness imparting agent, and an abrasion resistance improver. Specific examples thereof include a hindered phenol compound, a hindered amine compound, a sulfur compound, a phosphorus compound, a benzophenone compound, a siloxane-modified resin, silicone oil, fluororesin particles, polystyrene resin particles, polyethylene resin particles, silica particles, alumina particles, and boron nitride particles.

The film thickness of the charge transporting layer is preferably 5 to 50 μm, more preferably 8 to 40 μm, and particularly preferably 10 to 30 μm.

The charge transporting layer can be formed by preparing a charge-transporting-layer coating liquid containing each of the above materials and a solvent, forming a film, and drying the film. Examples of the solvent used in the coating liquid include an alcohol-based solvent, a ketone-based solvent, an ether-based solvent, an ester-based solvent, and an aromatic hydrocarbon-based solvent. Of these solvents, an ether-based solvent or an aromatic hydrocarbon-based solvent is preferable.

(2) Monolayer Type Photosensitive Layer

The monolayer type photosensitive layer can be formed by preparing a photosensitive-layer coating liquid containing a charge generating material, a charge transporting material, a resin, and a solvent, forming a film, and drying the film. Examples of the charge generating material, the charge transporting material, and the resin are the same as those in the above "(1) Laminate type photosensitive layer".

<Protection Layer>

In the present invention, a protection layer may be provided on a photosensitive layer. Providing the protection layer can improve durability.

The protection layer preferably contains electroconductive particles and/or a charge transporting material, and a resin.

Examples of the electroconductive particles include particles of metal oxides such as titanium oxide, zinc oxide, tin oxide, and indium oxide.

Examples of the charge transporting material include a polycyclic aromatic compound, a heterocyclic compound, a hydrazone compound, a styryl compound, an enamine compound, a benzidine compound, a triarylamine compound, and a resin having a group derived from these materials. Of these, a triarylamine compound and a benzidine compound are preferable.

Examples of the resin include a polyester resin, an acrylic resin, a phenoxy resin, a polycarbonate resin, a polystyrene resin, a phenol resin, a melamine resin, and an epoxy resin. Of these, a polycarbonate resin, a polyester resin, and an acrylic resin are preferable.

In addition, the protection layer may be formed as a cured film by polymerizing a composition containing a monomer having a polymerizable functional group. Examples of the reaction in this case include a thermal polymerization reaction, a photopolymerization reaction, and a radiation polymerization reaction. Examples of the polymerizable functional group of the monomer having a polymerizable functional group include an acrylic group and a methacrylic group. As the monomer having a polymerizable functional group, a material having charge transporting ability may be used.

The protection layer may contain additives such as an antioxidant, an ultraviolet absorber, a plasticizer, a leveling agent, a slipperiness imparting agent, and an abrasion resistance improver. Specific examples thereof include a hindered phenol compound, a hindered amine compound, a sulfur compound, a phosphorus compound, a benzophenone compound, a siloxane-modified resin, silicone oil, fluororesin particles, polystyrene resin particles, polyethylene resin particles, silica particles, alumina particles, and boron nitride particles.

The thickness of the protection layer is preferably 0.5 to 10 μm, and preferably 1 to 7 μm.

The protection layer can be formed by preparing a protection-layer coating liquid containing each of the above materials and a solvent, forming a film, and drying and/or curing the film. Examples of the solvent used in the coating liquid include an alcohol-based solvent, a ketone-based solvent, an ether-based solvent, a sulfoxide-based solvent, an ester-based solvent, and an aromatic hydrocarbon-based solvent.

[Process Cartridge and Electrophotographic Apparatus]

The process cartridge according to the present invention integrally supports the electrophotographic photosensitive member described above and at least one unit selected from the group consisting of a charging unit, a developing unit, and a cleaning unit, and is detachably attachable to the main body of the electrophotographic apparatus.

In addition, the electrophotographic apparatus according to the present invention includes the electrophotographic photosensitive member described above, and at least one unit selected from the group consisting of a charging unit, an exposing unit, a developing unit, and a transfer unit.

FIG. 2 illustrates an example of a schematic configuration of an electrophotographic apparatus including a process cartridge including an electrophotographic photosensitive member.

The electrophotographic photosensitive member having a cylindrical shape 1 is rotationally driven at a predetermined peripheral speed in an arrow direction around a shaft 2. The surface of the electrophotographic photosensitive member 1 is charged to a predetermined positive or negative potential by the charging unit 3.

The drawing illustrates a roller charging method using a roller type charging member; however, a charging method such as a corona charging method, a proximity charging method, or an injection charging method may be adopted.

The charged surface of the electrophotographic photosensitive member 1 is irradiated with exposure light 4 from an exposing unit (not illustrated), and an electrostatic latent image corresponding to target image information is formed. The electrostatic latent image formed on the surface of the electrophotographic photosensitive member 1 is developed with the toner housed in the developing unit 5, and a toner image is formed on the surface of the electrophotographic photosensitive member 1. The toner image formed on the surface of the electrophotographic photosensitive member 1 is transferred to a transfer material 7 by a transfer unit 6. The transfer material 7 to which the toner image has been transferred is conveyed to a fixing unit 8, subjected to fixing treatment of the toner image, and printed out to the outside of the electrophotographic apparatus.

The electrophotographic apparatus may include a cleaning unit 9 for removing attached substances such as toner remaining on the surface of the electrophotographic photosensitive member 1 after transfer. In addition, there may be used a so-called cleanerless system that removes the attached substance by, for example, the developing unit 5 without separately providing the cleaning unit 9.

The electrophotographic apparatus may have a neutralization mechanism for neutralizing the surface of the electrophotographic photosensitive member 1 with pre-exposure light 10 from a pre-exposing unit (not illustrated). In addition, in order to attach and detach the process cartridge 11 according to the present invention to and from the main body of the electrophotographic apparatus, a guide unit 12 such as a rail may be provided.

The electrophotographic photosensitive member according to the present invention can be used for a laser beam printer, an LED printer, a copying machine, a facsimile, and a multifunction machine thereof.

The present invention can provide an electrophotographic photosensitive member capable of suppressing blurring of dots forming an output image.

EXAMPLES

Hereinafter, the present invention will be described in more detail with examples and comparative examples. The present invention is not limited at all by the following examples as long as it does not exceed the gist thereof. In the following description of examples, "part" is on a mass basis unless otherwise specified.

[Production of Support]

A support was produced by the following method.

Production Example of Support A-1

An extruded tube composed of JIS A 3003 alloy, formed by hot extruding, was subjected to cold drawing to provide a drawn tube having an outer diameter of 30.8 mm, an inner diameter of 28.5 mm, and a length of 370 mm.

Then, the drawn tube was placed in an electric furnace, the temperature of which was raised at a temperature rise rate of 5° C./min, then maintained at 450° C. for 2.5 hours, subsequently cooled at 2° C./min until the drawn tube reached 150° C., and taken out from the electric furnace after 24 hours.

The surface was mirror-finished after annealing to provide a "support A-1" having an outer diameter of 30.5 mm, an inner diameter of 28.5 mm, and a length of 370 mm. The production conditions of the support A-1 are shown in Table 1.

Elemental analysis of the drawn tube used found that it was an Al alloy including 0.16% by mass of Si, 0.2% by mass of Fe, 0.08% by mass of Cu, 1.3% by mass of Mn, and 0.02% by mass of Zn.

Production Example of Supports A-2 to A-14

A support was produced in the same manner as in the production example of the support A-1, except that the same drawn tube was used and the annealing conditions were changed as shown in Table 1 in the production example of the support A-1. The obtained supports are referred to as "supports A-2 to A-14". The production conditions of the supports A-2 to A-14 are shown in Table 1.

Production Example of Support A-15

An extruded tube composed of JIS A 6063 alloy, formed by hot extruding, was subjected to cold drawing to provide a drawn tube having an outer diameter of 30.8 mm, an inner diameter of 28.5 mm, and a length of 370 mm.

Then, the drawn tube was placed in an electric furnace, the temperature of which was raised at a temperature rise rate of 5° C./min, then maintained at 450° C. for 5.0 hours, subsequently cooled at 5° C./min until the drawn tube reached 150° C., and taken out from the electric furnace after 24 hours.

The surface was mirror-finished after annealing to provide a "support A-15" having an outer diameter of 30.5 mm, an inner diameter of 28.5 mm, and a length of 370 mm. The production conditions of the support A-15 are shown in Table 1.

Elemental analysis of the drawn tube used found that it was the Al alloy including 0.5% by mass of Si, 0.3% by mass of Fe, 0.07% by mass of Cu, 0.08% by mass or less of Mn, 0.7% by mass of Mg, 0.04 to 0.35% by mass of Cr, 0.08% by mass or less of Zn, and 0.06% by mass of Ti.

Production Example of Support A-16

An extruded tube composed of JIS A 3003 alloy, formed by hot extruding, was subjected to cold drawing to provide a drawn tube having an outer diameter of 30.8 mm, an inner diameter of 28.5 mm, and a length of 370 mm.

Then, the drawn tube was placed in an electric furnace, the temperature of which was raised at a temperature rise rate of 5° C./min, then maintained at 450° C. for 2.5 hours, subsequently cooled at 5° C./min until the drawn tube reached 150° C., and taken out from the electric furnace after 24 hours.

The surface was mirror-finished after annealing to provide a "support A-16" having an outer diameter of 30.5 mm, an inner diameter of 28.5 mm, and a length of 370 mm. The production conditions of the support A-16 are shown in Table 1.

Elemental analysis of the drawn tube used found that it was an Al alloy including 0.5% by mass of Si, 0.6% by mass of Fe, 0.15% by mass of Cu, 1.2% by mass of Mn, and 0.8% by mass of Zn.

Production Example of Support B-1

An extruded tube composed of JIS A 6063 alloy, formed by hot extruding, was subjected to cold drawing to provide a drawn tube having an outer diameter of 30.8 mm, an inner diameter of 28.5 mm, and a length of 370 mm.

Then, the drawn tube was placed in an electric furnace, the temperature of which was raised at a temperature rise rate of 5° C./min, then maintained at 450° C. for 2.5 hours, subsequently cooled at 5° C./min until the drawn tube reached 150° C., and taken out from the electric furnace after 24 hours.

The surface was mirror-finished after annealing to provide a "support B-1" having an outer diameter of 30.5 mm, an inner diameter of 28.5 mm, and a length of 370 mm. The production conditions of the support B-1 are shown in Table 1.

Elemental analysis of the drawn tube used found that it was the Al alloy including 0.5% by mass of Si, 0.3% by mass of Fe, 0.07% by mass of Cu, 0.08% by mass or less of Mn, 0.7% by mass of Mg, 0.04 to 0.35% by mass of Cr, 0.08% by mass or less of Zn, and 0.06% by mass of Ti.

Production Example of Supports B-2 to B-14

A support was produced in the same manner as in the production example of the support B-1, except that the same drawn tube was used and the annealing conditions were changed as shown in Table 1 in the production example of the support B-1. The obtained supports are referred to as "supports B-2 to B-14". The production conditions of the supports B-2 to B-14 are shown in Table 1.

Support B-15

A support was produced in the same manner as in the production example of the support A-1, except that the annealing conditions were changed as shown in Table 1 in the production example of the support A-1. The obtained support is referred to as a "support B-15". The production conditions of the support B-15 are shown in Table 1.

Production Examples of Support C-1 to Support C-10

A support was produced in the same manner as in the production example of the support A-1, except that the annealing conditions were changed as shown in Table 1 in the production example of the support A-1. The obtained supports are referred to as "supports C-1 to C-10". The production conditions of the supports C-1 to C-10 are shown in Table 1.

Production Examples of Support C-11 to Support C-12

Annealing was performed under the conditions shown in Table 1 by using a drawn tube composed of an Al—Mg alloy containing 2.5% by mass of magnesium and having an outer diameter of 30.8 mm, an inner diameter of 28.5 mm, and a length of 370 mm. The surface was mirror-finished after annealing to provide a "support C-11 and a support C-12" having an outer diameter of 30.5 mm, an inner diameter of 28.5 mm, and a length of 370 mm. The production conditions of the support C-11 and the support C-12 are shown in Table 1.

Production Examples of Support D-1 to Support D-10

A support was produced in the same manner as in the production example of the support B-1, except that the annealing conditions were changed as shown in Table 1 in the production example of the support B-1. The obtained supports are referred to as "support D-1 and support D-10". The production conditions of the support D-1 to support D-10 are shown in Table 1.

TABLE 1

| | | Annealing conditions | | | |
|---|---|---|---|---|---|
| Support | Al alloy | Temperature rise rate [° C./min] | Annealing temperature [° C.] | Holding time [hours] | Temperature fall rate [° C./min] |
| Support A-1 | A3003 | 5 | 450 | 2.5 | 2 |
| Support A-2 | A3003 | 5 | 435 | 2.5 | 5 |
| Support A-3 | A3003 | 5 | 435 | 2.0 | 5 |
| Support A-4 | A3003 | 5 | 425 | 2.5 | 5 |
| Support A-5 | A3003 | 7 | 435 | 2.5 | 5 |
| Support A-6 | A3003 | 7 | 435 | 2.0 | 5 |
| Support A-7 | A3003 | 10 | 435 | 2.3 | 5 |
| Support A-8 | A3003 | 10 | 435 | 2.0 | 5 |
| Support A-9 | A3003 | 15 | 435 | 2.0 | 5 |
| Support A-10 | A3003 | 15 | 405 | 2.0 | 5 |
| Support A-11 | A3003 | 15 | 440 | 2.5 | 5 |
| Support A-12 | A3003 | 5 | 405 | 2.0 | 2 |
| Support A-13 | A3003 | 20 | 435 | 5.0 | 5 |
| Support A-14 | A3003 | 40 | 435 | 5.0 | 5 |
| Support A-15 | A6063 | 5 | 450 | 5.0 | 5 |
| Support A-16 | A3003 | 5 | 450 | 2.5 | 5 |
| Support B-1 | A6063 | 5 | 450 | 2.5 | 5 |
| Support B-2 | A6063 | 5 | 435 | 2.5 | 5 |
| Support B-3 | A6063 | 5 | 435 | 2.0 | 5 |
| Support B-4 | A6063 | 5 | 425 | 2.5 | 5 |
| Support B-5 | A6063 | 7 | 435 | 2.5 | 5 |
| Support B-6 | A6063 | 7 | 435 | 2.0 | 5 |
| Support B-7 | A6063 | 10 | 435 | 2.3 | 5 |
| Support B-8 | A6063 | 10 | 435 | 2.0 | 5 |
| Support B-9 | A6063 | 15 | 435 | 2.0 | 5 |
| Support B-10 | A6063 | 15 | 405 | 2.0 | 5 |
| Support B-11 | A6063 | 15 | 440 | 2.5 | 5 |
| Support B-12 | A6063 | 5 | 405 | 2.0 | 2 |
| Support B-13 | A6063 | 20 | 435 | 5.0 | 5 |
| Support B-14 | A6063 | 40 | 435 | 5.0 | 5 |
| Support B-15 | A3003 | 5 | 450 | 5.0 | 5 |
| Support C-1 | A3003 | 5 | 360 | 2.0 | 5 |
| Support C-2 | A3003 | 5 | 550 | 2.0 | 5 |
| Support C-3 | A3003 | 5 | 250 | 4.0 | 5 |
| Support C-4 | A3003 | 5 | 400 | 2.0 | 5 |
| Support C-5 | A3003 | 5 | 220 | 1.0 | 5 |
| Support C-6 | A3003 | 5 | 210 | 0.5 | 5 |
| Support C-7 | A3003 | 5 | 200 | 2.0 | 5 |
| Support C-8 | A3003 | 5 | 300 | 2.0 | 5 |
| Support C-9 | A3003 | 2 | 200 | 2.5 | 2 |
| Support C-10 | A3003 | 2 | 550 | 2.5 | 2 |
| Support C-11 | Al—Mg alloy | 5 | 380 | 2.0 | 5 |
| Support C-12 | Al—Mg alloy | 5 | 420 | 2.0 | 5 |
| Support D-1 | A6063 | 5 | 360 | 2.0 | 5 |
| Support D-2 | A6063 | 5 | 550 | 2.0 | 5 |
| Support D-3 | A6063 | 5 | 250 | 4.0 | 5 |
| Support D-4 | A6063 | 5 | 400 | 2.0 | 5 |
| Support D-5 | A6063 | 5 | 220 | 1.0 | 5 |
| Support D-6 | A6063 | 5 | 210 | 0.5 | 5 |
| Support D-7 | A6063 | 5 | 200 | 2.0 | 5 |
| Support D-8 | A6063 | 5 | 300 | 2.0 | 5 |
| Support D-9 | A6063 | 2 | 200 | 2.0 | 2 |
| Support D-10 | A6063 | 2 | 550 | 2.0 | 2 |

<Production of Electrophotographic Photosensitive Member>

Production Example of Photosensitive Member A-1

The support A-1 was ultrasonically washed in an alkaline solution having a pH of 10.5, then washed with pure water, and finally immersed in hot water at 95° C. for 60 seconds, and the resultant support was used as a support.

Then, 100 parts of zinc oxide particles (specific surface area: 19 $m^2/g$, powder resistance: $3.6\times10^6$ Ω·cm) as a metal oxide were stirred and mixed with 500 parts of toluene, 0.8 parts of a silane coupling agent was added thereto, and the mixture was stirred for 6 hours. The silane coupling agent used was N-2-(aminoethyl)-3-aminopropylmethyldimethoxysilane (trade name: KBM602, manufactured by Shin-Etsu Chemical Co., Ltd.). Thereafter, toluene was distilled off under reduced pressure, and heating and drying were performed at 130° C. for 6 hours to provide surface-treated zinc oxide particles.

Then, the following materials were prepared.

15 parts of butyral resin (trade name: BM-1, manufactured by Sekisui Chemical Co., Ltd.) as polyol resin 15 parts of blocked isocyanate (trade name: SUMIDUR 3175, manufactured by Sumika Bayer Urethane Co., Ltd.)

These were dissolved in a mixed solution of 73.5 parts of methyl ethyl ketone and 73.5 parts of 1-butanol. To this solution were added 80.8 parts of the surface-treated zinc oxide particles and 0.8 parts of 2,3,4-trihydroxybenzophenone (manufactured by Tokyo Chemical Industry Co., Ltd.), and these were dispersed for 3 hours under an atmosphere of 23±3° C. by using a sand mill apparatus using glass beads having a diameter of 0.8 mm.

Then, the following materials were prepared.

0.01 parts of silicone oil (trade name: SH28PA, manufactured by Dow Corning Toray Silicone Co., Ltd.)

5.6 parts of crosslinked polymethyl methacrylate (PMMA) particles (trade name: TECHPOLYMER SSX-102, manufactured by Sekisui Plastics Co., Ltd., average primary particle size 2.5 μm)

These were added to the solution after dispersion and stirred to prepare an undercoat-layer coating liquid.

This undercoat-layer coating liquid was dip-coated on the support, and the obtained film was dried at 160° C. for 40 minutes to form an undercoat layer having a film thickness of 18 μm.

Then, the following materials were prepared.

20 parts of hydroxygallium phthalocyanine crystal (charge generating material) of a crystal form having peaks at 7.4° and 28.2° with a Bragg angle of 2θ±0.2° in CuKα characteristic X-ray diffraction 0.2 parts of a calixarene compound represented by the following formula (A):

(A)

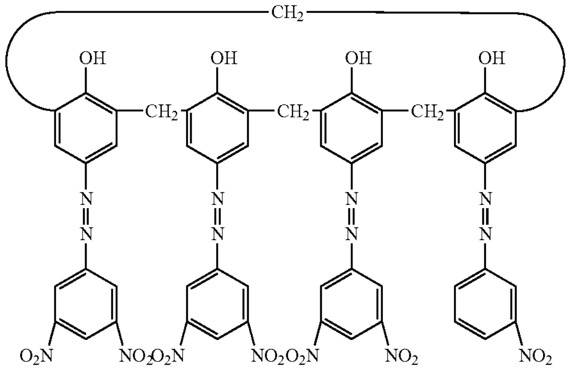

10 parts of polyvinyl butyral (trade name: S-LEC BX-1, manufactured by Sekisui Chemical Co., Ltd.)

600 parts of cyclohexanone

These were placed in a sand mill using glass beads having a diameter of 1 mm, and subjected to dispersion treatment for 4 hours. Thereafter, 700 parts of ethyl acetate were added to prepare a charge-generating-layer coating liquid. This charge-generating-layer coating liquid was dip-coated on the undercoat layer, and the obtained film was dried at 80° C. for 15 minutes to be formed into a charge generating layer having a film thickness of 0.17 μm.

Then, the following materials were prepared.

30 parts of a compound represented by the following formula (B) (charge transporting material)

60 parts of a compound represented by the following formula (C) (charge transporting material)

10 parts of a compound represented by the following formula (D) (charge transporting material)

(B)

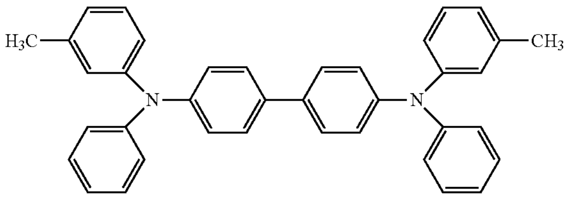

(C)

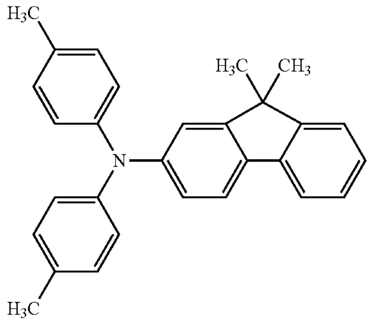

(D)

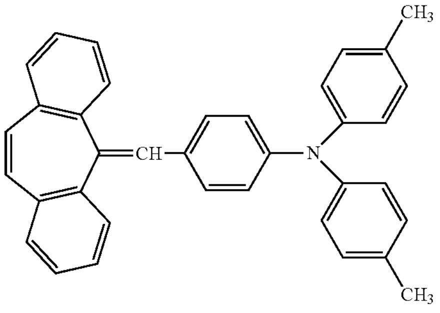

100 parts of polycarbonate resin (trade name: Iupilon Z400, bisphenol Z type polycarbonate, manufactured by Mitsubishi Engineering-Plastics Corporation)

0.02 parts of polycarbonate (viscosity average molecular weight Mv: 20000) represented by the following formula (E):

(E)

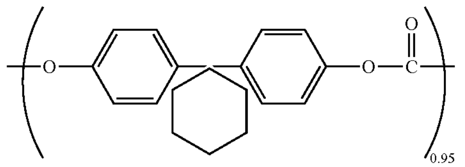

-continued

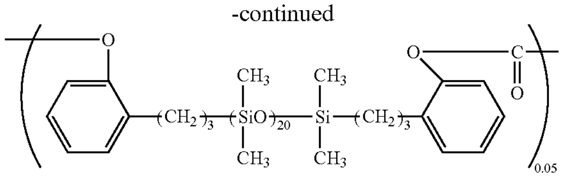

These were dissolved in a mixed solvent of 600 parts of mixed xylene and 200 parts of dimethoxymethane to prepare a charge-transporting-layer coating liquid. This charge-transporting-layer coating liquid was dip-coated on the charge generating layer to be formed into a film, and the obtained film was dried at 100° C. for 30 minutes to be formed into a charge transporting layer having a film thickness of 18 μm.

Then, a mixed solvent of 20 parts of 1,1,2,2,3,3,4-heptafluorocyclopentane (trade name: Zeorora H, manufactured by Zeon Corporation)/20 parts of 1-propanol was filtered through a polyflon filter (trade name: PF-040, manufactured by Advantec Toyo Kaisha, Ltd.).

In addition, the following materials were prepared.

90 parts of a hole transporting compound represented by the following formula (F):

(F)

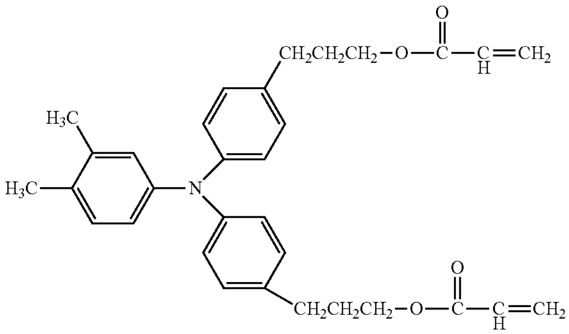

70 parts of 1,1,2,2,3,3,4-heptafluorocyclopentane 70 parts of 1-propanol

These were added to the mixed solvent. This was filtered through a polyflon filter (trade name: PF-020, manufactured by Advantec Toyo Kaisha, Ltd.) to prepare a second-charge-transporting-layer (protection-layer) coating liquid. This second-charge-transporting-layer coating liquid was dip-coated on the charge transporting layer, and the obtained film was dried at 50° C. for 6 minutes in the air. Thereafter, the film was irradiated with an electron beam for 1.6 seconds under the conditions of an acceleration voltage of 70 kV and an absorbed dose of 8000 Gy while the support (irradiated body) was rotated at 200 rpm in nitrogen. Subsequently, the film was heated by raising the temperature from 25° C. to 125° C. in nitrogen over 30 seconds. The oxygen concentration of the atmosphere during electron beam irradiation and subsequent heating was 15 ppm. Then, a heat treatment was performed at 100° C. for 30 minutes in the air to form a second charge transporting layer (protection layer) cured with an electron beam and having a film thickness of 5 μm.

Then, a linear groove was formed on the surface of the protection layer by using a polishing sheet (trade name: GC3000, manufactured by Riken Corundum Co., Ltd.). The feed speed of the polishing sheet was 40 mm/min, the rotation speed of the workpiece was 240 rpm, and the polishing-sheet pressing pressure on the workpiece was 7.5 $N/m^2$. The feeding direction of the polishing sheet and the rotation direction of the workpiece were the same direction. In addition, a backup roller having an outer diameter of 40 cm and an Asker C hardness of 40 was used. Under these conditions, linear grooves were formed on the peripheral surface of the workpiece over 10 seconds.

Thus, the photosensitive member A-1 was produced.

Production Examples of Photosensitive Member A-2 to Photosensitive Member A-16, Photosensitive Member B-1 to Photosensitive Member B-15, Photosensitive Member C-1 to Photosensitive Member C-12, and Photosensitive Member D-1 to Photosensitive Member D-10

An electrophotographic photosensitive member was produced in a same manner as the photosensitive member A-1, except that the support shown in Table 2 was used. The obtained electrophotographic photosensitive member is referred to as a "the photosensitive member A-2 to the photosensitive member A-14, the photosensitive member B-1 to the photosensitive member B-15, the photosensitive member C-1 to the photosensitive member C-12, and the photosensitive member D-1 to the photosensitive member D-10".

[Evaluation]

The photosensitive member A-1 was prepared and mounted on a cyan station of an electrophotographic apparatus (copier) (trade name: imagePRESS C910, manufactured by Canon Inc.) as an evaluation apparatus, and image evaluation was performed as follows.

A cyan station of the above evaluation apparatus was installed under an environment of 23° C./50% RH, and the following conditions were set.

Paper: GFC-081 (81.0 $g/m^2$, Canon Marketing Japan Inc.)

Vcontrast: 300 V (adjusted by DC voltage $V_{DC}$ of developer carrier, charging voltage $V_D$ of electrostatic latent image carrier, and laser power)

Evaluation image: a vertical line image of one dot and one space, arranged on the A4 paper A blur value (a numerical value representing how a line is blurred, defined by ISO 13660) was used as an evaluation index of dot reproducibility. The blur value was measured by using a personal IAS (image analysis system, manufactured by Quality Engineering Associates Inc.). The obtained blur value was evaluated according to the following criteria. These results are shown in Table 2.

A: blur value of less than 33 μm

B: blur value of less than 35 μm

C: blur value of 35 μm or more and less than 38 μm

D: blur value of 38 μm or more and less than 41 μm

E: blur value of 41 μm or more and less than 45 μm

Positions corresponding to 1/8, 2/8, 3/8, 4/8, 5/8, 6/8, and 7/8 of the total length in the axial direction from any one end of the support were determined. Furthermore, each position was divided into four by 90° in the circumferential direction. At each of 28 points where the axial division line and the circumferential division line intersect, a fragment of 10 mm square was cut out so that the intersection of the axial division line and the circumferential division line was at the center. The protection layer was removed with a polishing sheet, and then the photosensitive layer was removed by using methyl ethyl ketone. Thereafter, the surface of the support was exposed and mirror-finished by buffing. Then, the treatment of being immersed in an aqueous sodium hydroxide solution for 1 minute to provide a sample for crystal orientation observation. For a 100 μm square region on which the center of the surface of the obtained sample, that is, intersection of the axial division line and the circumferential division line of the support was centered, observation was performed by the SEM-EBSP method, and the ratio of the area occupied by Al crystal grains having each crystal orientation and the average area of Al crystal grains were calculated. These results are shown in Table 2.

TABLE 2

| | | | Crystal grain | | | | Evaluation | |
|---|---|---|---|---|---|---|---|---|
| Example/ | | | Ratio of area occupied by crystal grains of each orientation in 100 μm square region (%) | | | Average area | Blur value | |
| Comparative Example | Photosensitive member | Support | (α) | (β) | (γ) | [μm$^2$] | [μm] | Rank |
| Example A-1 | Photosensitive member A-1 | Support A-1 | 2 | 96 | 2 | 71 | 30 | A |
| Example A-2 | Photosensitive member A-2 | Support A-2 | 5 | 93 | 2 | 70 | 30 | A |
| Example A-3 | Photosensitive member A-3 | Support A-3 | 8 | 90 | 2 | 64 | 30 | A |
| Example A-4 | Photosensitive member A-4 | Support A-4 | 15 | 81 | 4 | 68 | 31 | A |
| Example A-5 | Photosensitive member A-5 | Support A-5 | 21 | 75 | 4 | 73 | 31 | A |
| Example A-6 | Photosensitive member A-6 | Support A-6 | 19 | 75 | 6 | 62 | 34 | B |
| Example A-7 | Photosensitive member A-7 | Support A-7 | 24 | 72 | 4 | 60 | 34 | B |
| Example A-8 | Photosensitive member A-8 | Support A-8 | 27 | 67 | 6 | 58 | 36 | C |
| Example A-9 | Photosensitive member A-9 | Support A-9 | 31 | 61 | 8 | 10 | 38 | D |
| Example A-10 | Photosensitive member A-10 | Support A-10 | 30 | 60 | 10 | 46 | 38 | D |
| Example A-11 | Photosensitive member A-11 | Support A-11 | 31 | 65 | 4 | 55 | 37 | C |
| Example A-12 | Photosensitive member A-12 | Support A-12 | 2 | 97 | 1 | 68 | 30 | A |
| Example A-13 | Photosensitive member A-13 | Support A-13 | 17 | 80 | 3 | 20 | 30 | A |
| Example A-14 | Photosensitive member A-14 | Support A-14 | 16 | 79 | 5 | 8 | 32 | A |
| Example A-15 | Photosensitive member A-15 | Support A-15 | 13 | 85 | 2 | 65 | 32 | A |
| Example A-16 | Photosensitive member A-16 | Support A-16 | 3 | 95 | 2 | 75 | 30 | A |
| Example B-1 | Photosensitive member B-1 | Support B-1 | 91 | 7 | 2 | 54 | 31 | A |
| Example B-2 | Photosensitive member B-2 | Support B-2 | 85 | 11 | 4 | 48 | 32 | A |
| Example B-3 | Photosensitive member B-3 | Support B-3 | 83 | 14 | 3 | 50 | 32 | A |
| Example B-4 | Photosensitive member B-4 | Support B-4 | 78 | 17 | 5 | 57 | 32 | A |
| Example B-5 | Photosensitive member B-5 | Support B-5 | 76 | 19 | 5 | 50 | 32 | A |
| Example B-6 | Photosensitive member B-6 | Support B-6 | 75 | 18 | 7 | 44 | 34 | B |
| Example B-7 | Photosensitive member B-7 | Support B-7 | 73 | 22 | 5 | 42 | 34 | B |
| Example B-8 | Photosensitive member B-8 | Support B-8 | 68 | 24 | 8 | 40 | 36 | C |
| Example B-9 | Photosensitive member B-9 | Support B-9 | 63 | 27 | 10 | 33 | 40 | D |
| Example B-10 | Photosensitive member B-10 | Support B-10 | 61 | 29 | 10 | 35 | 40 | D |
| Example B-11 | Photosensitive member B-11 | Support B-11 | 65 | 31 | 4 | 30 | 38 | C |
| Example B-12 | Photosensitive member B-12 | Support B-12 | 95 | 4 | 1 | 55 | 31 | A |
| Example B-13 | Photosensitive member B-13 | Support B-13 | 78 | 17 | 5 | 20 | 31 | A |
| Example B-14 | Photosensitive member B-14 | Support B-14 | 16 | 79 | 5 | 7 | 32 | A |
| Example B-15 | Photosensitive member B-15 | Support B-15 | 13 | 85 | 2 | 48 | 31 | A |
| Comparative Example C-1 | Photosensitive member C-1 | Support C-1 | 32 | 33 | 35 | 2 | 41 | E |
| Comparative Example C-2 | Photosensitive member C-2 | Support C-2 | 36 | 31 | 33 | 1 | 41 | E |
| Comparative Example C-3 | Photosensitive member C-3 | Support C-3 | 37 | 30 | 33 | 2 | 42 | E |
| Comparative Example C-4 | Photosensitive member C-4 | Support C-4 | 26 | 39 | 35 | 2 | 42 | E |
| Comparative Example C-5 | Photosensitive member C-5 | Support C-5 | 33 | 33 | 34 | 3 | 41 | E |
| Comparative Example C-6 | Photosensitive member C-6 | Support C-6 | 33 | 33 | 34 | 3 | 41 | E |
| Comparative Example C-7 | Photosensitive member C-7 | Support C-7 | 31 | 30 | 39 | 1 | 42 | E |
| Comparative Example C-8 | Photosensitive member C-8 | Support C-8 | 39 | 31 | 30 | 3 | 42 | E |
| Comparative Example C-9 | Photosensitive member C-9 | Support C-9 | 33 | 33 | 34 | 3 | 41 | E |
| Comparative Example C-10 | Photosensitive member C-10 | Support C-10 | 26 | 36 | 38 | 1 | 41 | E |
| Comparative Example C-11 | Photosensitive member C-11 | Support C-11 | 31 | 14 | 55 | 3 | 42 | E |
| Comparative Example C-12 | Photosensitive member C-12 | Support C-12 | 27 | 15 | 58 | 2 | 42 | E |
| Comparative Example D-1 | Photosensitive member D-1 | Support D-1 | 30 | 36 | 34 | 2 | 41 | E |
| Comparative Example D-2 | Photosensitive member D-2 | Support D-2 | 31 | 36 | 33 | 3 | 42 | E |
| Comparative Example D-3 | Photosensitive member D-3 | Support D-3 | 32 | 33 | 35 | 2 | 41 | E |
| Comparative Example D-4 | Photosensitive member D-4 | Support D-4 | 30 | 38 | 32 | 4 | 41 | E |
| Comparative Example D-5 | Photosensitive member D-5 | Support D-5 | 31 | 38 | 31 | 3 | 42 | E |
| Comparative Example D-6 | Photosensitive member D-6 | Support D-6 | 33 | 29 | 38 | 3 | 41 | E |
| Comparative Example D-7 | Photosensitive member D-7 | Support D-7 | 38 | 26 | 36 | 3 | 41 | E |
| Comparative Example D-8 | Photosensitive member D-8 | Support D-8 | 29 | 39 | 32 | 3 | 42 | E |
| Comparative Example D-9 | Photosensitive member D-9 | Support D-9 | 30 | 37 | 33 | 2 | 42 | E |
| Comparative Example D-10 | Photosensitive member D-10 | Support D-10 | 33 | 29 | 38 | 4 | 42 | E |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-031218, filed Feb. 26, 2021, and Japanese Patent Application No. 2021-203748, filed Dec. 15, 2021, which are hereby incorporated by reference herein in their entirety.

What is claimed is:

1. An electrophotographic photosensitive member comprising: a support with a cylindrical shape; and a photosensitive layer, wherein the support has a surface formed of Al and/or an Al alloy, and the surface of the support comprises an Al crystal grain having (α) plane having {001} orientation of −15° or more and less than +15°, (β) plane having {101} orientation of −15° or more and less than +15°, and (γ) plane having {111} orientation of −15° or more and less than +15°, a ratio of an area occupied by an Al crystal grain having (γ) to the total area of the surface of the support is 10% or less, and a ratio of an area occupied by any one of an Al crystal grain having (α) and an Al crystal grain having (β) is 60% or more.

2. The electrophotographic photosensitive member according to claim 1, wherein a ratio of an area occupied by the Al crystal grain having (β) to a total area of a surface of the support is 67% or more.

3. The electrophotographic photosensitive member according to claim 1, wherein a ratio of an area occupied by the Al crystal grain having (β) to a total area of a surface of the support is 75% or more.

4. The electrophotographic photosensitive member according to claim 1, wherein a ratio of an area occupied by the Al crystal grain having (α) to a total area of a surface of the support is 67% or more.

5. The electrophotographic photosensitive member according to claim 1, wherein a ratio of an area occupied by the Al crystal grain having (α) to a total area of a surface of the support is 75% or more.

6. The electrophotographic photosensitive member according to claim 1, wherein a ratio of an area occupied by the Al crystal grain having (γ) to a total area of a surface of the support is 5% or less.

7. The electrophotographic photosensitive member according to claim 1, wherein an average area of an Al crystal grain is 5 $\mu m^2$ or more on a surface of the support.

8. The electrophotographic photosensitive member according to claim 1, wherein the support is an Al alloy comprising Cu in an amount of 0.05 to 0.2% by mass and Mn in an amount of 1.0 to 1.5% by mass.

9. The electrophotographic photosensitive member according to claim 1, wherein the support is an Al alloy comprising Si in an amount of 0.2 to 0.6% by mass and Mg in an amount of 0.45 to 0.9% by mass.

10. A process cartridge, integrally supporting an electrophotographic photosensitive member and at least one unit selected from the group consisting of a charging unit, a developing unit, and a cleaning unit, and being detachably attachable to a main body of an electrophotographic apparatus the electrophotographic photosensitive member comprising: a support with a cylindrical shape; and a photosensitive layer, wherein the support has a surface formed of Al and/or an Al alloy, and the surface of the support includes an Al crystal grain having (α) plane having {001} orientation of −15° or more and less than +15°, (β) plane having {101} orientation of −15° or more and less than +15°, and (γ) plane having {111} orientation of −15° or more and less than +15°, a ratio of an area occupied by an Al crystal grain having (γ) to the total area of the surface of the support is 10% or less, and a ratio of an area occupied by any one of an Al crystal grain having (α) and an Al crystal grain having (β) is 60% or more.

11. An electrophotographic apparatus comprising: an electrophotographic photosensitive member; a charging unit; an exposing unit; a developing unit; and a transfer unit the electrophotographic photosensitive member comprising: a support with a cylindrical shape; and a photosensitive layer, wherein the support has a surface formed of Al and/or an Al alloy, and the surface of the support includes an Al crystal grain having (α) plane having {001} orientation of −15° or more and less than +15°, (β) plane having {101} orientation of −15° or more and less than +15°, and (γ) plane having {111} orientation of −15° or more and less than +15°, a ratio of an area occupied by an Al crystal grain having (γ) to the total area of the surface of the support is 10% or less, and a ratio of an area occupied by any one of an Al crystal grain having (α) and an Al crystal grain having (β) is 60% or more.

* * * * *